3,224,689
COLLOID MILLS
Walter A. Behrens and David F. O'Keefe, Valley Stream, N.Y., assignors to Chemicolloid Laboratories, Inc., Garden City Park, N.Y., a corporation of New York
Filed May 25, 1962, Ser. No. 197,711
16 Claims. (Cl. 241—256)

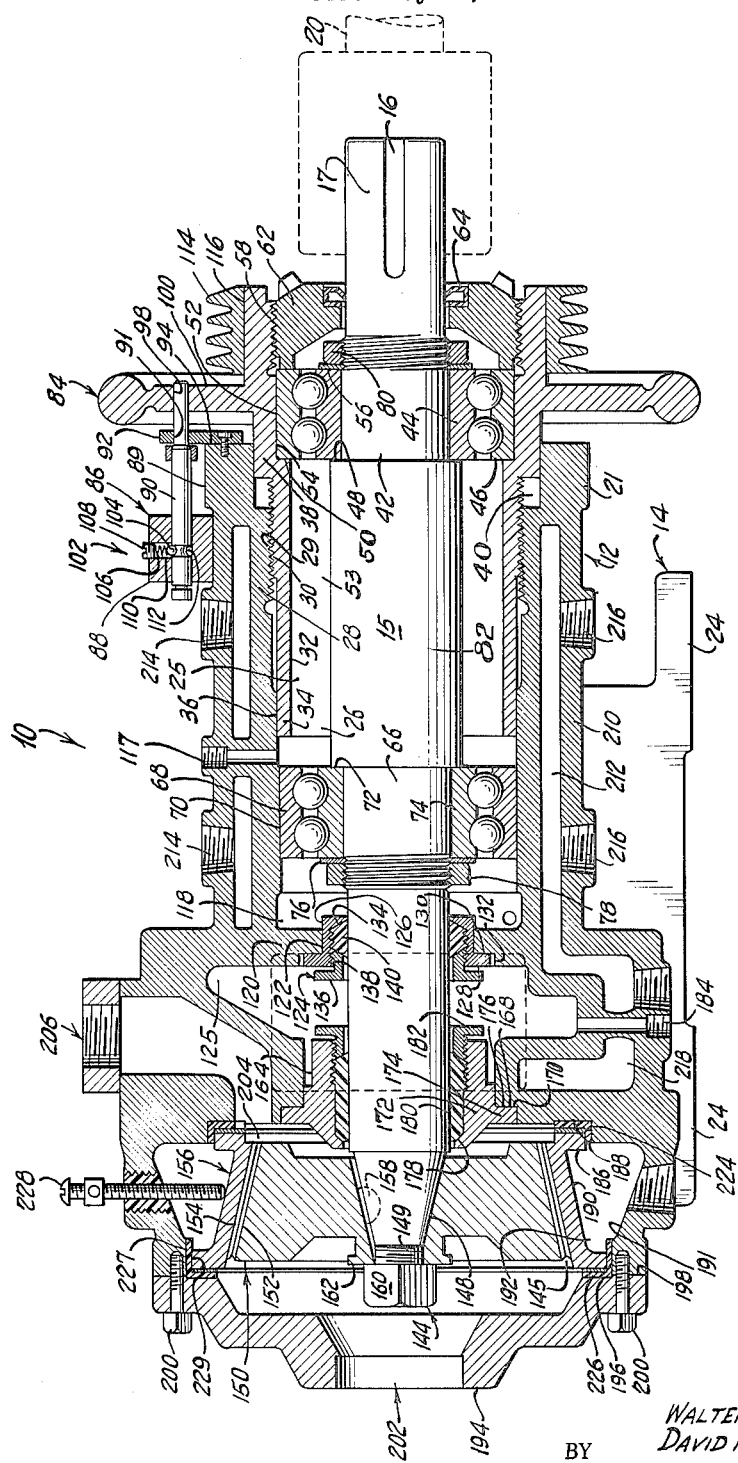

The parts of high speed colloid mills must be assembled with very high degrees of accuracy, with very close tolerances. Problems presented by the size of the structure, accessibility of parts for repair, replacement, cleaning, and other operations, which enter into the operation of a device of this nature, require solution. Mills of this type may be required to operate with viscous material. The operation of such mills, in most cases at a high degree of efficiency, requires that such apparatus be taken apart from time to time. The ease of taking the machine apart and putting it together again is an element in the efficiency of operation. Obviously, where the operation involves long shut down periods, as has often been the practice with prior machines, the increased cost of operation involves necessary stand-by equipment.

It is an object of the invention to provide a colloid mill wherein the several parts, including those of the rotating members, are made easily accessible, and wherein those parts are made for removal with facility, and wherein the number of parts are reduced to a minimum, and wherein the shut-down period for repairs and like operations is reduced to a great degree, while obtaining a complete sealing of the mill itself from the supporting means therefor.

It is an object of the invention to provide a stator-rotor relationship where the stator and rotor may be adjusted with relation to each other with simplicity, and from a position outside of the mill, and wherein the shaft for driving the rotor is supported so that the transmission of torque through the shaft will not interfere with this adjustability, or the ability to lock the parts together.

It is an object of the invention to provide a structure of the type indicated for adjustment of the rotor and stator with relation to each other, where such adjustment may be made at a position removed from the source of power, as, for instance, where an electric motor is used, and where such adjustment is made wholly within the mill proper and without necessitating any change in the position of the drive shaft of the motor.

It is an object of the invention to make both stator and rotor accessible with a minimum number of steps of assembly or taking apart required, and to facilitate cleaning the milling chamber and replacing parts which wear out, such as seals and packing, with the manipulation of the fewest possible members.

It is an object of the invention to provide, for a structure of the type described, in which the entire drive shaft is movable with relation to fluids or other material which are capable of leakage, positive means to prevent leakage of lubricant and other materials past such movable shaft while the mill is operating.

It is an object of the invention to provide a support for the shaft of a mill of the type defined wherein the bearings for the shaft are movable with the shaft, but wherein end thrust as well as other bearing forces are accommodated automatically by means for adjusting the shaft by moving it along its axis.

It is an object of the invention to provide, in a colloid mill of the type herein defined, means for lubricating the shaft of the mill during the operation of rotor and stator in milling material fed through the milling chamber, while eliminating possibility of leakage between the chamber in which the shaft is supported and the milling chamber.

It is an object of the invention to provide, in a colloid mill of the type herein described, an arrangement for packing the shaft of the mill at the milling chamber, and at the support chamber, so that each packing may be removed with facility and without requiring complete disruption of the operation of the apparatus, and the taking apart of the entire mill.

It is an object of the invention to provide a colloid mill of the type indicated wherein means are disposed so that it is made possible, by a simple connection, to subject the material being milled to an electrical potential which may be of any selected polarity, in order to introduce such electrical phenomena as ionization, or otherwise to utilize the effects of an electrical potential, during the functioning of the colloid mill; in such case, a specific polarity, or an alternating polarity, may be applied as determined, to effect chemical or other changes in the material being milled continuously during the operation.

It is an object of the invention to provide, in a mill of the type indicated, means for housing the stator and rotor of the mill so that the stator may be removed as a unit, and then the rotor and the shaft upon which the rotor may be mounted may then be withdrawn with facility through the chamber of the housing in which the supporting means for the apparatus is housed.

It is an object of the invention to provide, in a mill of the type indicated, means for supporting the rotor so that it is readily removable from the housing, either with or without the removal of the stator from the assembly, and thus the entire apparatus may be opened up for access to such packing as is positioned to seal the milling chamber and the lubricating chamber in which the rotating support for the shaft is housed.

It is an object of the invention to provide, in a mill of the type indicated, a separate drip chamber between the milling chamber and the supporting chamber, to eliminate possibility of intermingling at any time throughout the milling operation, of lubricant and material being milled.

It is an object of the invention to provide, for a mill of the type herein described, an operational mechanism supported by a single housing, and having a single continuous shaft for driving the mill, and means for utilizing cooling or other fluid means for effecting heat transfer continuously throughout the operation of the mill without interfering with that operation, and wherein the heat transfer fluid is brought directly into heat transfer relationship with the walls of the supporting chamber in which lubricant for the bearings may be retained, and also with the bearing portions at which packing glands supporting the shaft are positioned, and finally with the end wall against which the stator may be secured, in order to provide substantially positive and constant heat movement through that wall.

It is an object of the invention to provide, in a mill of the type here defined, a structure for supporting the stator with relation to the housing in which the apparatus of the mill is supported so that the stator may be isolated electrically from the housing, and thus provide the ability to apply an electrical potential between the stator and the rotor.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such constuction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the Statutes for disclosure of an operative embodiment, but not to show all of the various forms and modifications in which the invention might be embodied.

On the drawings, in which the same reference characters refer to the same parts throughout, and in which is disclosed such a practical construction, the figure is a longitudinal cross-sectional view of a colloid mill embodying features of the invention.

On the drawings, the colloid mill 10 shown may comprise a housing 12 mounted upon a base 14. Extending substantially from end to end of and through the housing is a shaft 15. Shaft 15 may have a slot 16 at one end to provide means by which shaft 15 may be driven by a shaft 20 of a motor (not shown). Shafts 15 and 20 are loosely coupled to permit relative movement of the two shafts with relation to each other, and also may be separated at will. Then the motor may be moved aside so that many of the operations upon mill 10 to be described may be effected as desired.

Housing 12 may be provided by a casting 21, or by other suitable structure. Base 14 may include a footing 24 by means of which the mill may be secured firmly to a foundation or other suitable support. The housing has a bore or passage 25 which may be considered to be divided into several sections. One of these sections is a chamber 26 in which may be located the means for supporting shaft 15. At one end of chamber 26 toward the coupling of shafts 15 and 20, walls 28 of chamber 26 are provided with threads 29 to receive the complementary threads 30 on a sleeve 32.

Sleeve 32 has an unthreaded, relieved section 34, which, as can be seen at 36, is substantially of the same diameter as that portion of chamber walls 28 so that a snug fit may be effected; the fit, however, is such as to permit movement of sleeve 32 axially along chamber 26. Sleeve 32 also may have an enlarged portion 38 which may be dimensioned to seat snugly within counterbore 40, and to provide a liquid seal at that position.

Shaft 15 may be provided with a reduced section 42 with which a ball bearing 44 may be associated. Housing 46 of the ball bearing may be disposed to abut against a face 48 formed by reduced section 42, and also against a face 50 of a counterbore 52 of bore 53 of sleeve 32. Housing 46 also rolls on section 42. The ball bearing rides upon wall 54 of counterbore 52. The ball bearing may be adjusted, by means of end thrust members 56, so that its housing 46 is secured to rotate with shaft 15. Internal threading 58 in counterbore 52 may be provided to receive a lock screw member 62 which also may carry an oil seal 64, to assure against leakage of lubricant from chamber 26 past the shaft during operation of the apparatus.

Another reduced section 66 may be provided on shaft 15 to receive ball bearing 68, which may be mounted substantially in the same manner as ball bearing 44. Ball bearing 68 is positioned in this case to be borne directly upon wall 70 of chamber 26, and may be held in place, against end face 72 formed at reduced section 66, by engagement of housing 74 of the ball bearing with that end face, and by means of a thrust member 76 on shaft 15. A member 78 may be threaded upon shaft 15 to engage against thrust member 76, and is locked in position to hold the ball bearing against face 72.

It is possible thus, when shaft 15 is separated from the housing, to assemble bearings 44 and 68 with shaft 15 merely by threading up members 78 and 80 at the two ends of enlarged portion 82 of the shaft. However, to assemble bearing 44 fully, sleeve 32 must be associated with the shaft and the bearing, to retain the bearing properly in association both with the sleeve and with the shaft at the same time.

Sleeve 32 may be provided with a hand wheel 84 to rotate the sleeve when the assembly of the sleeve with housing 12 has been completed. Thus, when the sleeve is associated with housing 12, and it is rotated, the interaction of threads 29 and 30 on such rotation will cause movement of the shaft and the bearings carried thereby lengthwise of housing 12, as it may be desired. A locking device 86 may be provided to secure hand wheel 84 against movement out of a position to which it has been adjusted. For device 86, a block 88 may be assembled upon outer wall 89 of housing 12. Through a bore in that block, a pin 90 may be extended. The pin may have support and be guided by extending through an opening 91 in a plate 92 secured to end face 94 of the housing. The pin is intended to engage spaced apart openings 98 formed in web 100 of the hand wheel. Thus, when the hand wheel has been rotated to a position where it is desired that it be retained, pin 90 is inserted through the opening 98 corresponding with that position. A click 102, consisting of a ball 104, a spring 106, and an adjusting screw 108 positioned within a threaded passage 110, is pressed into a cam groove 112 in the pin, to keep the pin against accidental removal from that opening.

A finned sleeve 114 may be pressed upon the outer surface 116 of sleeve 32 at the enlarged portion 38 to provide means for dissipating heat developed by the rotation of bearing 44 in the sleeve. Bearings 44 and 68 run in an oil bath, provided by lubricant retained within chamber 26. A suitable passage 117 may be provided to supply chamber 26 with oil.

Within housing 12, at a through passage 118, a partition wall 120 is provided. That wall has an opening 122 in which packing means 124 are received. Packing means 124 serve to seal off chamber 26 from drip chamber 125 where shaft 15 extends through opening 122 between the chambers. Packing means 124 may comprise a packing member 126 which is snugly seated in and tightly pressed into opening 122. Preferably securing means (not shown) engage through a flange 128 of packing member 126 and into wall 120, to clamp the flange against a face 130 of a countersunk recess 132 in wall 120. Packing member 126 may include an angularly disposed face 134. A gland 136 may threadedly engage in threaded bore 138 of member 126 so as to compress packing 140 against the body of shaft 15, so that it may function against the passage of fluid from chamber 26 to drip chamber 125.

If it is desired to remove packing means 124, access to gland 136 may be obtained through drip chamber 125; then, by a suitable wrench, the gland may be loosened and disengaged. Thereafter, the securing means (not shown), which may include a plurality of bolts, may be disengaged from openings through flange 128 and in wall 120 in which they were engaged. These bolts may then be inserted into other openings in flange 128; then, by taking up on those bolts so positioned, and now engaging directly against face 130, packing member 126 may be retracted from opening 122. The entire assembly, including gland 134, may thus be removed from the rotor end of shaft 15.

The other end 144 of shaft 15 removed from end 17 extends into milling chamber 145, and is tapered to provide a tapered end 148 which may terminate in a threaded stud 149. Mounted upon tapered end 148 is a rotor 150. The rotor may take the usual form, with its external surface 152 provided with ribs or other means by means of which a flow of material will be induced during a milling operation. The external surface 152 of the rotor is disposed at a taper angle opposite to that of the taper of end 148. That tapered surface 152 is substantially frustroconical. The taper angle may conform closely to the taper of face 154 of stator 156, or it may be of a different angularity, for the purpose of milling different materials. The rotor is splined, at 158, to tapered end 148 so that the stator is retained fixedly with relation to the shaft. A cap nut 160 may provide means for tightening against a face 162 of the rotor, to force the rotor firmly upon the taper of tapered end 148, and thus to lock the rotor in position.

Just behind rotor 150 is packing means 164 for sealing milling chamber 145 against passage of material being milled into drip chamber 125. For the purpose of retaining packing means 164, a wall 168 of drip chamber 125 is provided with a countersunk recess 170 for receiving a packing member 172. Member 172 may have a flange 174. By suitable securing means, the flange may be secured in and abutted against a face 176 of recess 170 substantially as described in connection with packing member 126. Packing member 172 likewise may have a beveled end face 178. Packing 180, received around the shaft, is pressed against end face 178 by a gland 182 received in member 172.

Other suitable packing means, such as a rotating metal ring and a stationary carbon ring seal, may be substituted for the structure here described. Such substitute packing may be provided to eliminate the drag against the shaft as the packing is compressed against the shaft, but sufficing to retain material within milling chamber 145 from passing into drip chamber 125. Drip chamber 125 is made large enough to receive the drippings from the two packings if they take place, and to pass them out through a duct 184 which may be provided with piping for the necessary disposal of such drippings.

Stator 156 may be made as a single casting, which may have face 154 machined so as to provide the necessary grooving to cooperate with the grooving on rotor 150. Stator 156 may have a flanged end 186. On one construction shown, that flanged end may be disposed to seat within a recessed portion 188 of wall 168, and may be anchored in that position by suitable securing means. Other constructions are feasible to retain the stator. For instance, head or cover 194 may make pressure contact against the stator. An inside wall 190 of the casting may be formed to cooperate with a wall 191 formed in housing 12, to define a passage 192 for the reception of a heating or cooling fluid.

With the stator secured in place in the manner indicated, and held in that position, head 194 is secured on the end of the housing. For this purpose, the head may have a facing 196 milled or otherwise provided to engage against a like end facing 198 on housing 12. The two parts are abutted in face-to-face relationship; cap screws 200 may be used to retain the parts secured. An opening 202 provides inlet means for the entry of material into the milling chamber, to flow through the spaces between the stator and the rotor, and then to be extruded into space 204 at the rear of the rotor, and from thence into outlet passage 206.

Walls 210 of housing 12 may have passages 212 provided therein for the movement of heating or cooling fluids therethrough. Openings 214 and 216 may be utilized either as inlets or outlets as the purposes of the device require, so that the fluid for heating or cooling may be passed around the walls of the bearing chamber, and then to passage 218 to be brought into contact with the walls of milling chamber 145, there to remove heat as may be required at that position for cooling the seal. Passage 192 may have separate inlet and outlet means so as to pass a heating or cooling fluid around wall 190 at the position where a large amount of heat may be produced during the operation of the rotor.

Suitable means may be provided herein to obtain a different result in milling. It is believed that, at the high speeds of milling, a state of ionization of the particles ensues in that what amounts to a static charge appears to be carried by the particles as they are being milled. Thus, the application of an electrical potential of different characteristics, according to the material within the very small space where milling occurs between the stator and the rotor, will either compensate for or accentuate the effects of such a static charge. For this purpose, the stator may be mounted with relation to housing 12 and head 194 so as to be completely insulated electrically therefrom. In this manner, an electrical potential may be applied directly to the rotor by a commutator (not shown), or by a wiping contact of any kind, or by directly coupling one electrode of an electric circuit to the housing. If a commutator or wiping contact is used, the electrical potential may then be completely confined to shaft 15, and the parts mounted thereon. For safety purposes, it is desirable that the pole connected to the shaft be the pole connected to the ground.

To provide proper insulation of stator 156, insulating material, such as Teflon or the like, may be used to provide a formed washer or gasket 224 at recessed portion 188 where stator 156 is received. When stator 156 is secured in position, insulating screws will be required to assure against transmission of current directly from the stator to housing 12. At faces 196 and 198, a similar method of sealing the stator from head 194 and housing 12 may be utilized. A gasket 226, likewise of an insulating material such as Teflon, may be interposed between the stator and end facings 196 and 198 as well as face 227 against which the outer periphery 229 of the stator bears. Any suitable conductor 228 may be utilized for impressing a voltage from a suitable electrical potential to the stator.

Now a voltage of any potential or polarity, or even of alternating polarity, may be applied to the stator and the rotor, as the milling operation may require, and as determinations may be reached, in order to facilitate the milling operation. The electrical ion relationship of the particles being broken down by the milling operation may thus be turned to advantage to facilitate those milling operations by the imposition of a suitable potential. As milling proceeds, a current will flow, by reason of the potential imposed, either from the stator to the rotor, or reversely, as the operator may find desirable in facilitating the operations of breaking down the molecules of the matter being milled. In some cases, an alternating potential may be found to function for this purpose.

Many other changes could be effected in the particular construction, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. In a colloid mill, a housing having a support chamber and a milling chamber, a stator in the milling chamber, a single continuous shaft extending from end to end through the housing, a rotor for the mill mounted on the shaft in the milling chamber in milling relationship to the stator, a sleeve in the support chamber, a plurality of bearing means providing the sole support for the shaft, certain of the bearing means being positioned in the support chamber between the shaft and the sleeve and the walls of the support chamber, and means for moving the sleeve, the bearing means and the shaft as a unit lengthwise of the support chamber.

2. In a colloid mill, a housing having a support chamber and a milling chamber, a stator in the milling chamber, a single continuous shaft extending from end to end through the housing, a rotor for the mill mounted on the shaft in the milling chamber in milling relationship to the stator, a sleeve in the support chamber, a plurality of bearing means providing the sole support for the shaft, certain of the bearing means being positioned in the support chamber between the shaft and the sleeve and at least one of the bearing means being positioned between the shaft and the walls of the support chamber, means for retaining the bearing means to move with the sleeve and the shaft, and means for moving the sleeve and thereby the shaft lengthwise of the support chamber.

3. In a colloid mill, a housing having a support chamber and a milling chamber, a stator in the milling chamber, a single continuous shaft extending from end to end through the housing, a rotor for the mill mounted on the shaft in the milling chamber in milling relationship to the stator, a sleeve in the support chamber, a plurality of bearing means providing the sole support for the shaft, the bearing means being positioned in the support chamber and being associated with and held to move lengthwise with the shaft, at least one of the bearing means being carried by the walls of the support chamber and certain of the bearing means being carried by the sleeve, means for retaining the bearing means and the sleeve against relative lengthwise movement, and means for moving the sleeve and thereby the shaft lengthwise of the support chamber.

4. In a colloid mill, a base for the mill, a housing fixed to the base and having a support chamber and a milling chamber, a stator in the milling chamber, a single continuous shaft extending from end to end through the housing, a rotor for the mill mounted on the shaft in the milling chamber in milling relationship to the stator, the support chamber providing a lubricant reservoir, a sleeve in the support chamber, bearing means providing the sole support for the shaft, the bearing means being positioned in the support chamber between the shaft and the sleeve and the walls of the support chamber, means for sealing against loss of lubricant from the reservoir as the shaft rotates, and means for moving the sleeve, the bearing means and the shaft as a unit lengthwise of the support chamber and the housing, the sealing means including means moving with and having substantially no relative linear movement with relation to the shaft.

5. In a colloid mill, a housing having a support chamber, and a milling chamber, a stator in the milling chamber, a single continuous shaft extending from end to end through the housing, a rotor for the mill mounted on the shaft in the milling chamber in milling relationship to the stator, a trap chamber between the milling and support chambers, sealing means for the shaft between the support chamber and the trap chamber and between the milling chamber and the trap chamber, bearing means providing the sole support for the shaft, the bearing means being positioned in the support chamber between the shaft and the walls of the support chamber, and means for moving the bearing means and thereby the shaft lengthwise of the support chamber.

6. In a colloid mill, a housing having a support chamber, a removable head for mounting one one end of the housing, and with the housing defining a milling chamber, a singe continuous shaft extending from end to end through the housing, a frustro-conical stator held removably secured by the head between the head and the end of the housing and within the milling chamber, a frustro-conical rotor on the shaft within the milling chamber and in interfitting cooperating relation to the stator, the rotor being secured to the end of the shaft by means requiring only the separation of the head from the housing end to provide access to said securing means, bearing means providing the sole support for the shaft, the bearing means being positioned in the support chamber between the shaft and the walls of the support chamber, and means for moving the bearing means and thereby the shaft lengthwise of the support chamber to adjust the relationship of the rotor and the stator.

7. In a colloid mill, a housing having a support chamber, a removable head for mounting on one end of the housing, and with the housing defining a milling chamber, a single continuous shaft extending from end to end through the housing, a frustro-conical stator held removably secured by the head between the head and the end of the housing and within the milling chamber, the taper of the working surface of the stator being away from the head, a frustro-conical rotor on the shaft within the milling chamber and in interfitting cooperating relationship to the stator, the rotor being secured to the end of the shaft by means requiring only the separation of the head from the housing end to provide access to said securing means, bearing means providing the sole support for the shaft, the bearing means being positioned in the support chamber between the shaft and the walls of the support chamber, a trap chamber having a common wall with the milling chamber, a single wall between the trap chamber and the support chamber, the support chamber providing a lubricant reservoir, sealing means for the shaft carried by the common wall and by the single wall, and means for moving the bearing means and thereby the shaft lengthwise of the support chamber to adjust the relationship of the rotor and the stator, the housing, the shaft and the bearing means being constructed so that the shaft and the bearing means are removable from the housing through the support chamber when the rotor is removed from the shaft.

8. In a colloid mill, a housing having a support chamber and a milling chamber, a single continuous shaft extending from end to end through the housing, a stator removably secured to the housing within the milling chamber, a rotor removably secured to the shaft within the milling chamber and in cooperating relationship to the stator, bearing means providing the sole support for the shaft, the bearing means being positioned in the support chamber between the shaft and the walls of the support chamber, a trap chamber having a common wall with the milling chamber, a single wall between the trap chamber and the support chamber, the support chamber providing a lubricant reservoir, sealing means for the shaft carried by the common wall and by the single wall, the sealing means being removable through the milling chamber and the trap chamber, and means for moving the bearing means and thereby the shaft lengthwise of the support chamber to adjust the relationship of the rotor and the stator.

9. In a colloid mill, a housing having a support chamber and a milling chamber, a single continuous shaft extending from end to end through the housing, a stator removably secured to the housing within the milling chamber, a rotor removably secured to the shaft within the milling chamber and in cooperating relationship to the stator, bearing means providing the sole support for the shaft, the bearing means being positioned in the support chamber between the shaft and the walls of the support chamber, a trap chamber, a single wall between the trap chamber and the support chamber, the support chamber providing a lubricant reservoir, sealing means for the shaft in the single wall, the sealing means being removable through the milling chamber, and means for moving the bearing means and thereby the shaft lengthwise of the support chamber to adjust the relationship of the rotor and the stator.

10. In a colloid mill, a housing having a support chamber and a milling chamber, a single continuous shaft extending from end to end through the housing, a stator removably secured to the housing within the milling chamber, the stator having an inwardly facing wall providing an opening increasing in dimensions outwardly from the portion of the stator secured to the housing, a rotor removably secured to the shaft within the milling chamber and having a face the contouring of which cooperates with the contouring of the stator wall opening, bearing means providing the sole support for the shaft, the bearing means being positioned in the support chamber between the shaft and the walls of the support chamber, means for moving the bearing means and thereby the shaft lengthwise of the support chamber to adjust the spacing between the stator wall and the rotor face, the bearing means being assembled on the shaft and the shaft and the bearing means being removable from the housing through the support chamber after the rotor has been removed from the shaft.

11. In a colloid mill, a housing having a support chamber and a milling chamber, a stator in the milling chamber, a single continuous shaft extending from end to end through the housing, a rotor for the mill mounted on the shaft in the milling chamber, the stator and the rotor having complementary opposed milling faces, the faces of the rotor and the stator in milling relationship being closely adjacent to each other to act upon material moved between the faces, the faces being electrically insulated from each other, bearing means providing the sole support for the shaft, the bearing means being positioned in the support chamber between the shaft and the walls of the support chamber, means for moving the bearing means and thereby the shaft lengthwise of the support chamber, and means for impressing an electrical potential between the stator and the rotor to cause a compensatory current to pass from face to face through the material between the faces during the milling operation.

12. In a colloid mill, a housing having a support chamber and a milling chamber, a stator in the milling chamber, a single continuous shaft extending from end to end through the housing, a rotor for the mill mounted on the shaft in the milling chamber, the stator and the rotor having complementary opposed milling faces, the faces of the rotor and the stator in milling relationship being closely adjacent to each other to act upon material moved between the faces, the faces being electrically insulated from each other, bearing means for the shaft in the support chamber, and means for impressing an electrical potential between the stator and the rotor to cause a compensatory current to pass from face to face through the material between the faces during the milling operation.

13. In a colloid mill, a housing having a support chamber and a milling chamber, a stator in the milling chamber, a single continuous shaft extending from end to end through the housing, a rotor for the mill mounted on the shaft in the milling chamber, the stator and the rotor having complementary opposed milling faces, the faces of the rotor and the stator in milling relationship being closely adjacent to each other to act upon material moved between the faces, the faces being electrically insulated from each other, bearing means for the shaft in the support chamber, and means for impressing an electrical potential of fixed polarity between the stator and the rotor to cause a compensatory current to pass from face to face through the material between the faces during the milling operation.

14. In a colloid mill, a housing having a support chamber and a milling chamber, a stator in the milling chamber and removably secured to the housing, a single continuous shaft extending from end to end through the housing, means for electrically insulating the stator from the housing, a rotor removably secured to the shaft within the milling chamber and cooperating with the stator, bearing means for the shaft; the stator having complementary opposed milling faces, the faces of the rotor and the stator in milling relationship being closely adjacent to each other to act upon material moved between the faces, the faces being electrically insulated from each other and the rotor to cause compensatory current to pass from face to face and through the material between the faces during the milling operation.

15. In a colloid mill, a housing having a support chamber and a milling chamber, a shaft extending from end to end through the housing, a stator in the milling chamber and removably secured to the housing, a head for closing the milling chamber, the head providing means for retaining the stator on the end of the housing, the stator and the housing forming a jacket for heat exchanging fluid, a rotor removably secured to the shaft within the milling chamber and cooperating with the stator, and means for supporting the shaft for rotation with relation to the support chamber.

16. In a colloid mill, a housing having a support chamber and a milling chamber, a shaft extending from end to end through the housing, a stator in the milling chamber and removably secured to an end wall of the housing, a head for closing the milling chamber, the head providing means for retaining the stator in place on the end of the housing, the stator and the housing forming a jacket for heat exchanging fluid, a trap chamber between the milling and support chambers, the support chamber providing a lubricant reservoir, bearing means between the shaft and the support chamber, and means for circulating a heat exchange fluid around the support chamber, the trap chamber and against said housing end wall.

References Cited by the Examiner
UNITED STATES PATENTS

| 2,591,966 | 4/1952 | Rider _____ 241—256 |
| 2,876,958 | 3/1959 | Edwards et al. _____ 241—256 |
| 2,947,485 | 8/1960 | Woodruff et al. _____ 241—256 |

FOREIGN PATENTS

| 560,412 | 10/1932 | Germany. |
| 836,911 | 6/1960 | Great Britain. |

ANDREW R. JUHASZ, *Primary Examiner.*

J. SPENCER OVERHOLSER, *Examiner.*